United States Patent
Cao et al.

(10) Patent No.: US 6,757,738 B1
(45) Date of Patent: Jun. 29, 2004

(54) METHOD AND APPARATUS FOR IMPROVING CHANNEL UTILIZATION

(75) Inventors: Carl F. Cao, Nepean (CA); Richard A. Houle, Nepean (CA); Dabin Wang, Nepean (CA); Fozia A. Zaidi, Ottawa (CA); Don W. Bennett, Ottawa (CA); Yajun Liu, Nepean (CA); Biswajit B. Nandy, Kanata (CA); Nabil N. Seddigh, North Gower (CA); Nausheen Naz, Ottawa (CA); Satheesa Nadaragh, Scarborough (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/572,863

(22) Filed: May 18, 2000

(51) Int. Cl.[7] .............................................. G06F 15/16
(52) U.S. Cl. ...................... 709/233; 709/230; 709/231; 709/232; 370/312; 370/335; 370/347; 370/431; 370/470; 370/473
(58) Field of Search ................................ 709/230–233; 370/389, 458, 335, 441, 312, 347, 473, 431, 470

(56) References Cited

U.S. PATENT DOCUMENTS

| | | | | |
|---|---|---|---|---|
| 5,790,551 A | * | 8/1998 | Chan ........................... | 370/458 |
| 5,802,048 A | * | 9/1998 | Duckwall .................... | 370/389 |
| 5,937,169 A | * | 8/1999 | Connery et al. ............. | 709/250 |
| 6,115,388 A | * | 9/2000 | Chinitz et al. ............... | 370/441 |
| 6,144,651 A | * | 11/2000 | Rinchiuso et al. ........... | 370/335 |
| 6,333,921 B1 | * | 12/2001 | Grube et al. ................. | 370/312 |
| 6,442,372 B1 | * | 8/2002 | Laham et al. ............. | 455/67.11 |
| 6,445,717 B1 | * | 9/2002 | Gibson et al. ............... | 370/473 |
| 6,453,360 B1 | * | 9/2002 | Muller et al. ............... | 709/250 |
| 6,466,976 B1 | * | 10/2002 | Alles et al. .................. | 709/224 |
| 6,498,790 B1 | * | 12/2002 | Shaheen et al. ............. | 370/347 |
| 6,519,469 B1 | * | 2/2003 | Rydnell et al. .............. | 455/466 |
| 2002/0114327 A1 | * | 8/2002 | Mononen ..................... | 370/389 |
| 2003/0067903 A1 | * | 4/2003 | Jorgensen .................... | 370/338 |

FOREIGN PATENT DOCUMENTS

EP 0201252 * 11/1986

* cited by examiner

*Primary Examiner*—Nabil El-Hady

(57) ABSTRACT

Systems and methods applicable in the context of the TCP/IP suite of protocols explicitly are provided which allow for separate and preferential treatment of L4–L7 control packets compared to the treatment of L7 data packets. This provides a performance gain at the cost of providing such preferential treatment for high error and long delay channels such as wireless links. Advantageously, channel utilization may be increased, for example by 5–50% depending on link conditions, on high error and long delay transmission links. More generally the invention distinguishes between control packets such as transport layer (for example, TCP, OSI Layer 4 or L4) and application layer (for example, OSI Layer 7) control packets and data packets, and transmits the control packets with higher reliability and lower delays. The benefit may be significant for IP applications where data objects transferred are small and are bursty, e.g., Web browsing and e-mail access.

9 Claims, 5 Drawing Sheets

US 6,757,738 B1

METHOD AND APPARATUS FOR IMPROVING CHANNEL UTILIZATION

FIELD OF THE INVENTION

The invention relates to a method and apparatus for improving channel utilization, for example channel utilization by IP (Internet Protocol) applications running over a wireless link.

BACKGROUND OF THE INVENTION

Control messages in IP based transport (e.g., L4 TCP (transport control protocol) messages) and upper layers (L5–L7) are carried in the same way as L7 data packets with the same delay and error characteristics, where L4, L5, L6 and L7 refer to the OSI model's transport, session, presentation and application layers respectively. This is in contrast to how other communications protocols afford minimum delay and high reliability transport to control messages. For example, in most wireless communications standards (such as CDMA2000) separate paths are provided for control signaling that have low error rates and low delay compared with the path used for non-control data.

To obtain optimal performance, all IP packets should be carried over a channel with minimum error and delay. However, this is unrealistic in many situations. For example, for wireless transmission, there is a minimum (still long) delay of approximately 100 ms. Additionally, the cost is high in terms of radio resources to reduce transmission errors and to increase the bit rate of data transfer (principally through increasing transmission power).

In each IP flow there can be defined three subclasses of packets. The first class consists of all TCP control packets, also referred to as L4 control packets. The second class consists of all control packets above TCP, for example control packets in L5 to L7. These will be referred to as "upper layer control packets". The third class consists of application layer data packets, also referred to as L7 data packets. The first and second classes can be combined and referred to collectively simply as "control packets". The control packets are usually transported between two end-hosts in a stop-and-wait manner meaning that if a control packet is lost or delayed the operations of the application stop until the control packet arrives correctly or is retransmitted. For this reason, the loss or delay of a control packet will have a much more significant impact on the overall performance of many IP applications than the loss or delay of a data packet.

For many IP applications, e.g., Web browsing and e-mail access, it is found that there is a significant difference in the utilization of a transmission channel depending upon factors such as delay and error rate. Referring to FIG. 1, curve 10 is a plot of the channel utilization as a function of increasing channel rate for a first channel with a high error rate, long delay, and additional variable delays due to L2 (layer 2) retransmissions required to deal with the errors. Curve 12 is a plot of the channel utilization as a function of increasing channel rate for a second channel with a low error rate and the same long delay but without the additional retransmission delays. The utilization of the second channel is much higher than is the utilization of the first channel.

Many IP applications, e.g., Web browsing, exhibit a behaviour that may be characterized as burst data transfer. They usually transport a small burst of data in one complete (e.g., TCP) session. Usually the data objects transferred are so small that they can be completed within the first (few) round trip times.

For each data object the application may proceed through (e.g., TCP) connection set-up, data transfer, and connection termination phases. The control packet interactions which dominate the complete session have the above mentioned stop-and-wait behaviour. FIGS. 2A and 2B illustrate this stop-and-wait behaviour in the context of a single TCP session of HTTP1.0 Web page retrieval where control message flow between a sender 20 and a receiver 22 is shown during connection setup and data transfer respectively. The behaviour during connection termination is similar. First, during TCP connection set-up, a L4 control packet (e.g., a SYN 24) is sent from one of the end-hosts (the receiver 22 of data), it is received by the other host (sender 20). The sender 20 waits during the transmission of the packet until it arrives. It ends a response packet (e.g., a reply SYN/ACK 26). Between the transmission of SYN 24 and the receipt of SYN 26, the receiver 22 stops and waits. Then the receiver 22 replies with message 28 to confirm the connection. During connection set-up and termination, almost all the (TCP layer control) packets are exchanged in the stop-and-wait manner.

During data transfer, the receiver 22 sends a HTTP "Get" (L7 control) packet 30 and the sender 20 replies with the requested data packets 32 in response. If the data transfer phase of the TCP session is still in slow-start, then data packets will also exhibit this stop-and-wait behaviour. As the TCP congestion window opens up more the degree of this stop-and-wait decreases gradually. If TCP is in the stable state, in response to each "Get" message, it is likely all the data packets for a particular Web page data entity will be released onto the transmission channel. The receiver 22 responds with ACKs 34 the last of which contains the L4 control message FIN.

In the examples of FIGS. 2A and 2B, the SYN 24, 26, 28 and ACK 34 packets are L4 control packets. "Get" 30 is a L7 control packet. When any of the control packets are disrupted, the interaction of the protocol is either stopped (for a packet loss) or delayed (for the amount of actual delay). This reduces the efficiency of the data transmission, and results in lower utilization of a transmission channel as everything stands still. For burst data transfer, because the stop-and-wait behavior dominates, the reduction in utilization is steep.

To different degrees, all IP applications have this stop-and-wait behaviour in their protocol interaction as a result of control packets which have to be exchanged between two end-hosts. This behaviour is very dominant in burst data transfer, e.g., POP3 (small e-mail), SMPT (small e-mail), and HTTP 1.0 (small Web browsing). It is slightly less so in HTTP 1.1. It is not a big problem for bulk data transfer, e.g., FTP. The long delays of wireless channels exacerbate the problem.

SUMMARY OF THE INVENTION

An embodiment of the invention applicable in the context of the TCP/IP suite of protocols explicitly provides separate and preferential treatment of L4–L7 control packets compared to the treatment of L7 data packets. It provides a performance gain at the cost of providing such preferential treatment for high error and long delay channels such as wireless links. Advantageously, channel utilization may be increased, for example by 5–50% depending on link conditions, on high error and long delay transmission links.

More generally the invention distinguishes between control packets such as transport layer (for example, TCP, OSI Layer 4 or L4) and application layer (for example, OSI Layer 7) control packets and data packets, and transmits the control packets with higher reliability and lower delays. In this way, the overall data transmission can be faster and more efficient as measured by the increase in the utilization of a transmission channel. This benefit may be significant for IP applications where data objects transferred are small and are bursty, e.g., Web browsing and e-mail access.

The invention is particularly applicable in high-speed wireless data transmission. In this environment, the one-way delay can be long (e.g., 100 ms). Physical layer transmission error rates are high (e.g., 10%) in order to preserve radio resources. Additional delays (e.g., 200–400 ms) are introduced by link layer retransmissions in order to compensate for the high physical layer error rate. Additional resources are required to transmit control packets reliably and with low delay, as they are typically small packets. At the same time, a significant gain in channel utilization is obtained as the interruption to data transmission is reduced. Advantageously the invention applied in this context addresses one of the major problems in high-speed wireless communications, this being the under-utilization of radio channels, for many IP applications. These channels are scarce resources as they are fundamentally limited by the available radio spectrum.

Advantageously no modification to the TCP/IP protocol layers at either end are required.

The packets can be classified as control or data packets on the basis of packet length. More generally, an embodiment of the invention provides a method of classifying a packet into one of a plurality of types by determining the packet's length, and then classifying the packet into one of the types as a function of the packet's length.

Advantageously, this method is processing efficient, and does not require the examination of the contents of individual packets, although such examination may enhance performance further.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
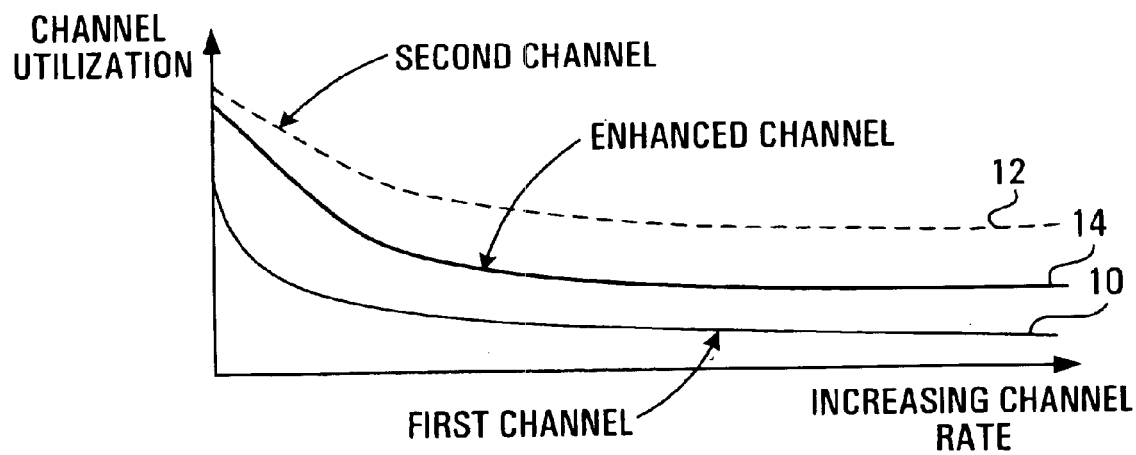
FIG. 1 is a plot of channel utilization vs. increasing channel rate for two conventional channels and a channel enhanced in accordance with an embodiment of the invention.
Figure 2A:
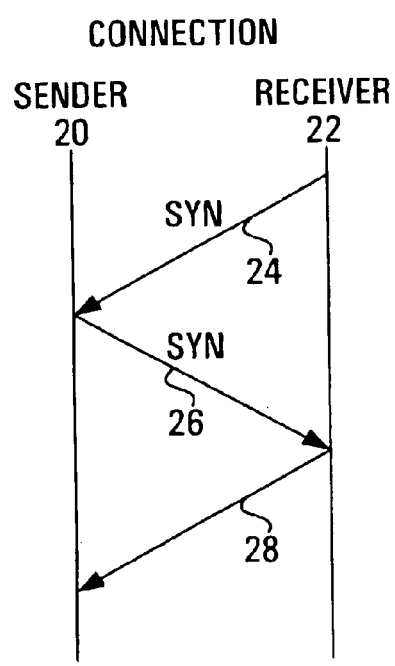
FIGS. 2A and 2B are message flow diagrams showing a typical stop-and-wait behaviour exhibited by control message exchanges for connection and data transfer respectively.
Figure 2B:
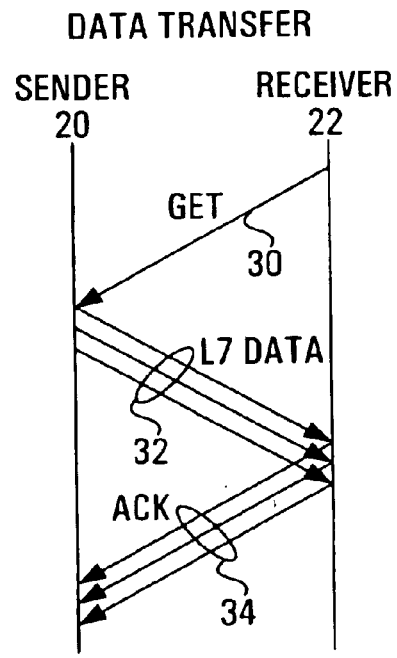

For IP applications, it has been found that if, in the same application, L4–L7 control packets are given preferential treatment compared to the treatment given to L7 data packets, the utilization of the overall transmission channel can be significantly increased. An example of this is shown in FIG. 1 where curve 14 is a plot of channel utilization as a function of increasing channel rate for a system in which L4–L7 control packets are carried on a channel having the performance characteristics plotted in curve 12 (i.e. the previously discussed "second channel"), while L7 data packets are carried on a channel having the performance characteristics plotted in curve 10 (i.e. the previously discussed "first channel"). It can be seen that a significant performance improvement is realized by giving preferential treatment to the control packets. The cost in terms of increased radio resources (e.g., transmission power) to reduce transmission errors of control packets so as to achieve this gain is low as the required bandwidth for control packets is small, typically in the range of 40 to 100 bytes, and are relatively few in number.

The invention is applicable to IP transport, but is also applicable to other transport protocols in which no distinction is made between the treatment of data packets to that of control packets. For example, CLNP (Connectionless Network Protocol) which is the ISO defined network layer protocol similar in function to the Internet Protocol (IP).

Figure 3:
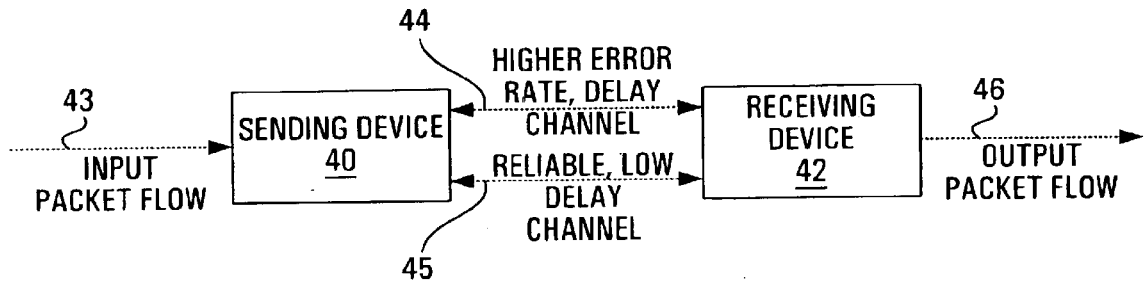
FIG. 3 is a block diagram of a generalized embodiment of the invention in which control messages are given preferred treatment by being transmitted on a reliable, low delay channel.

FIG. 3 is a very simple block diagram of very generalized implementation of the invention. There is a sending device 40 and a receiving device 42. The sending device 44 has a flow of packets (for example IP packets) which need to be sent to the receiving device 42. This might be in the form of an input packet flow 43, or alternatively the packets might be locally generated on the sending device 40. Similarly, the receiving device 42 either consumes the packet flow, or forwards it on as an output packet flow 46. Between the sending device 40 and the receiving device 42, in accordance with an embodiment of the invention, are provided two channels 44, 45. The first channel 44 is a higher error rate and delay channel, while the second channel 45 is a reliable, low delay channel, at least in comparison with the first channel 44.

Figure 4:
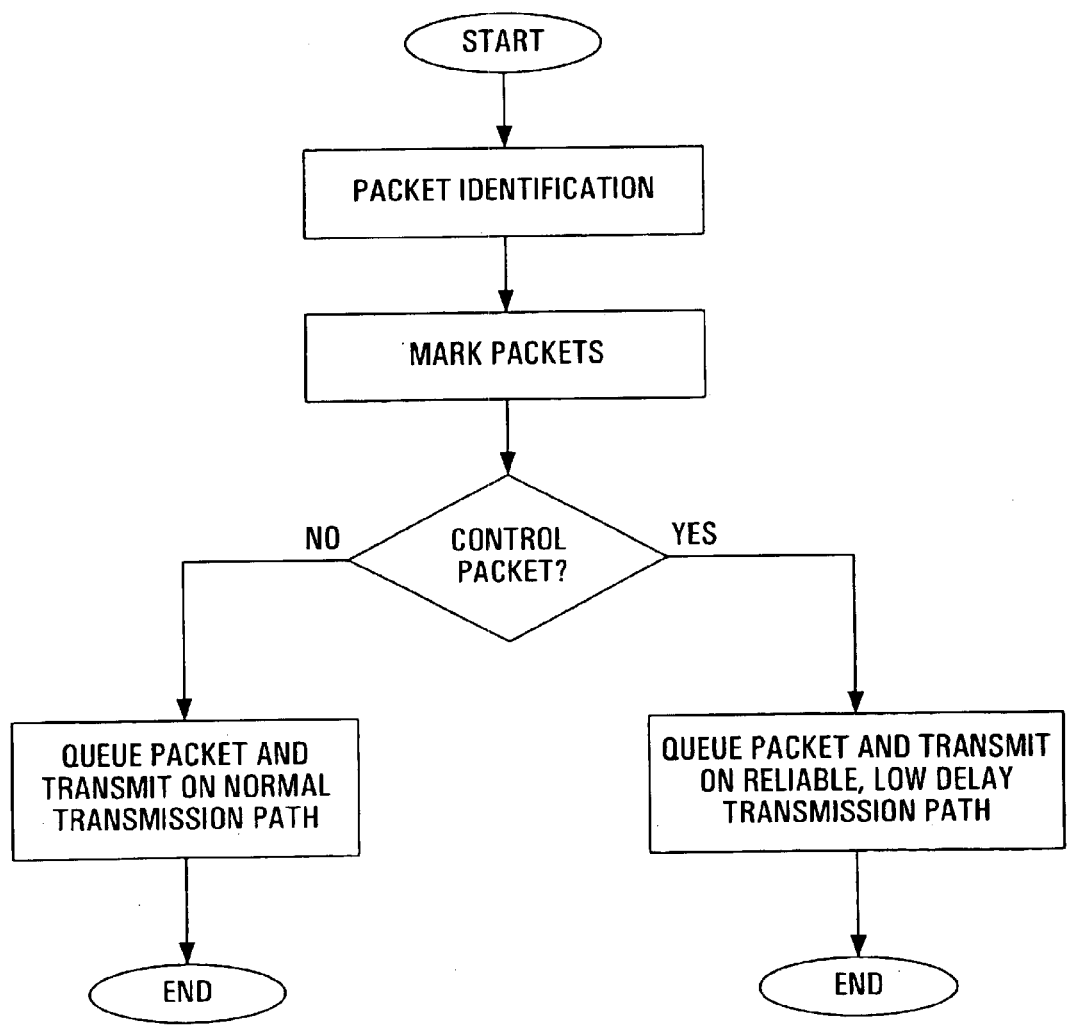
FIG. 4 is a flowchart for the method implemented by the sending device of FIG. 3 to provide preferred treatment to control messages.

FIG. 4 is a flowchart of an example of how packets are processed in the sending device 40. Of course, the underlying assumption is that before packets can be processed using this method, the above two identified transmission channels 44,45 need to be made available such that selected packets can be sent with high reliability and low delay. The second channel 45 might, for example, have different coding in the physical layer or be a link layer specialized (logical) channel. The method of FIG. 4 is executed in the sending device 40 for each packet to be transmitted from the sending device 40 to the receiving device 42. While devices 40,42 are referred to as the sending device and receiving device respectively, it is to be understood that packets may also flow from the receiving device 42 to the sending device 40. In this case, the method of FIG. 3 is executed in the receiving device for each such packet. The description which follows focuses on packets flowing from sending device 40 to receiving device 42.

First, control packets are identified in the flow of packets at the sending device 40. They are marked for example with an identification tag such that the subsequent steps can recognize them. This might be done for example using existing header flags (such as the ToS field in the IP header) or with proprietary bits added to an existing protocol, for example.

The identification tag of control packets can be recognized, and using these tags, the packets are sorted into two groups, one of which contains control packets (for example the above referenced L4–L7 control packets), the other of which contains the regular data packets (for example the above referenced L7 data packets). The control packets are then queued and transmitted on the high reliability and low delay transmission channel 44, and the data packets are queued and transmitted on the other channel 45.

If, after identifying packets as being control or data, the low layers allow the packets to be channeled to the appropriate link layer resource (channel 44 or channel 45) it would not be necessary to mark the packets with the identification tags.

Figure 5:
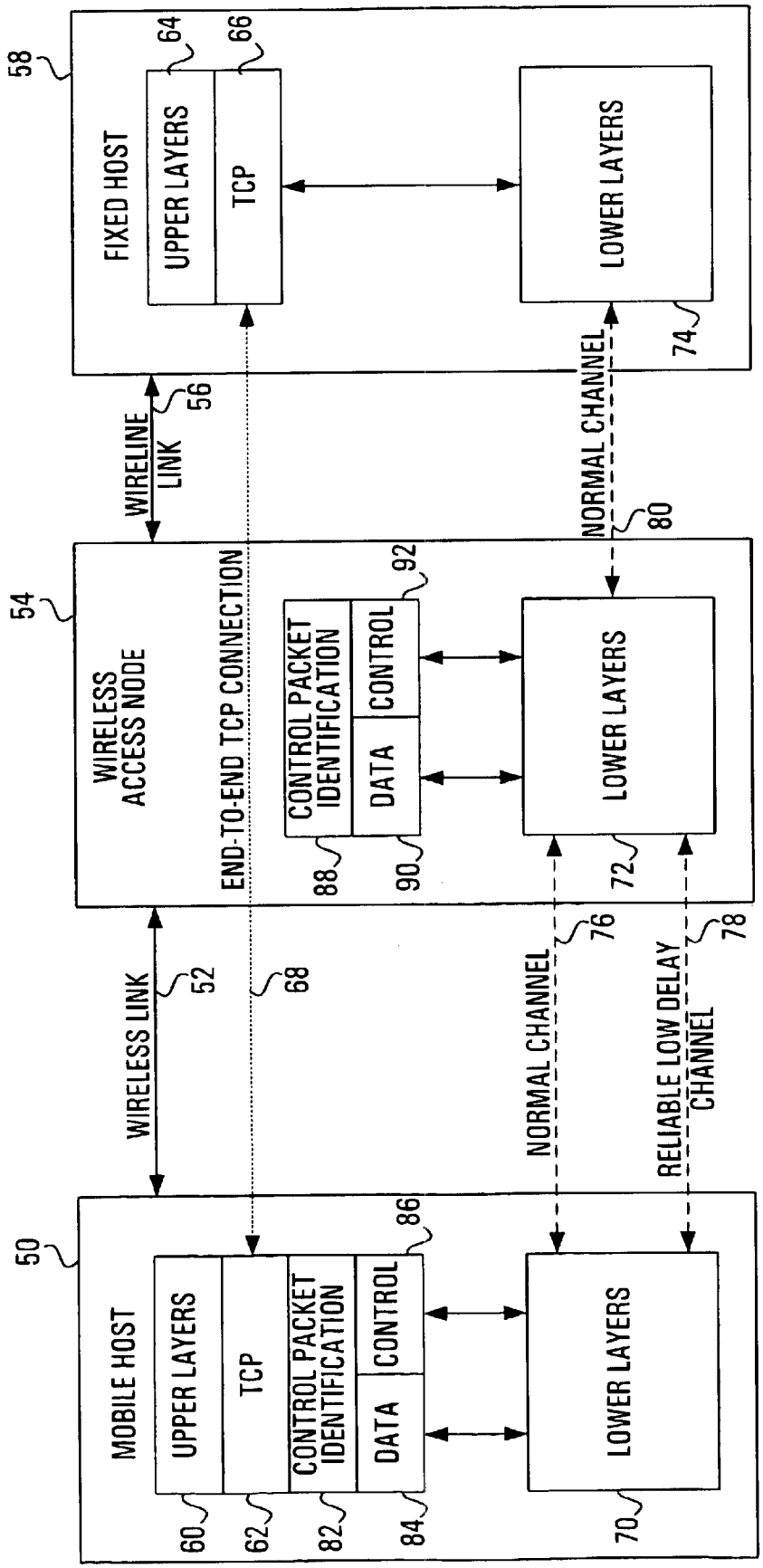
FIG. 5 is a block diagram of an embodiment of the invention as applied to a wireless link.

FIG. 5 illustrates a more specific example of how the invention may be implemented for a TCP/IP flow in a wireless environment. The example is specific to a TCP/IP flow in a direction towards a mobile host. However, it is to be understood the invention can also be applied in the reverse direction. A mobile host 50 is shown connected through a wireless link 52 to a wireless access node 54 which is in turn connected through a wireline link 56 to a fixed host 58. The protocol stack in the mobile host 50 includes upper layers 60 (L5 to L7) and a TCP layer 62 (L4). Similarly, the protocol stack in the fixed host includes upper layers 64 (L5 to L7) and a TCP layer 66 (L4). An end-to-end TCP session connection is indicated by 68. The invention does not require any changes to the TCP layer 62, 66.

The mobile host 50, wireless access node 54 and fixed host 58 each also has as part of its protocol stack respective lower layers 70, 72, 74 (in each case including L1 to L3). Between the mobile host 50 and the wireless access node 54 are established a normal channel 76 and a reliable low delay channel 78, both over the wireless link 52. A single normal channel 80 is shown between the wireless access node 54 and the fixed host 58. It is to be understood that the delay and error characteristics of a "normal channel" on the wireline link 56 would in most cases be far superior to those of a "normal channel" on the wireless link 52. In the mobile host 50 between the TCP layer 62 and the lower layers 70, a new layer entitled "control packet identification" 82 is shown. The purpose of the control packet identification layer 82 is to determine which packets to be transmitted on wireless link 52 are control packets 86 and which are data packets 84. A particular method of identifying such packets is presented by way of example further below. The control packet identification layer 82 marks the packets in a manner which allows the lower layers 70 to distinguish between packets identified as being control packets 84, and the remaining packets 86. The lower layers 70 then transmit control packets on the reliable low delay channel 78, and transmit the remaining packets on the normal channel 76. While the control packet identification layer 82 is shown separately in FIG. 5, it is to be understood that the identification and separation of control packets from the remaining packets is a step/functional block/layer that can be implemented/performed at any suitable point between the TCP layer 62, and the physical layer transmission over channels 76, 78, and would normally be implemented somewhere within the lower layers 70 and just above the radio link layer where it can select logical link layer entities and the physical channels. I will describe two options: 1) In this case, we will have two physically different channels. One channel will be of lower bandwidth, e.g., 14.4 KBPS, and the other of variable and high bandwidth, e.g., 38 KBPS–384 KBPS. Channel one will typically have much lower error rate, e.g., 0–1% Frame Erasure Rate (FER) and lower delay, say, 100 ms. Channel two will have much higher FER, e.g., 5–15%, and higher delay (plus retransmission delay) of 100–300 ms. We will send the (L4 and L7) control packets onto channel one, and all the (L7) data packets onto channel two. 2) In this case, we have one physical channel. However, it is divided into two logical channels. Logical channel one will have much more (redundant) coding such as higher-ratio convoluntional coding and logical channel two will have normal coding. As a result, it takes far more physical layer bits to encode one logical channel one bit than logical channel two bit. Logical channel one produces a 0–1% FER and logical channel two produces a FER of 5–15%. Overall, the two channel will have similar delay of 100, but logical channel two will need more retransmissions and results in a delay of 100–300 ms. We will send the (L4 and L7) control packets onto logical channel one, and all the (L7) data packets onto logical channel two.

Similarly, the wireless access node 54 has a control packet identification layer 88 for identifying control packets within the stream of packets coming from the fixed host 58 for transmission to the mobile host 50, and the control packets 92 thus identified are similarly given preferred treatment by being transmitted over the reliable low delay channel 78, with the remaining packets 92 being transmitted on the normal channel 76.

Between the wireless access node 54 and the fixed host 58, all packets are treated the same, in accordance with normal IP based transport.

Examples of control packets include, for TCP, SYN, ACK, FIN, for SMTP, "EHLO", "OK", for RTP, RTCP "CNAME" packets, and for VoIP, all H.323 packets. Control and data packets can be treated separately because they are always transmitted in sequence. Additionally, apart from TCP FIN and ACK piggybacked onto a data packet, when a control packet is in transit there are no data packets of the same packet flow (we can exclude FIN, ACK packets that are over 40 bytes from consideration). The only potential reordering of control and data packets occurs for FIN packets, but the TCP 2MSL 2×Maximum Segment Lifetime wait ensures that this will not impact TCP operation, i.e. TCP waits for a period of time after a FIN packet is received to allow in-transit data to be received before shutting down the connection.

Control Packet Identification

Figure 6:
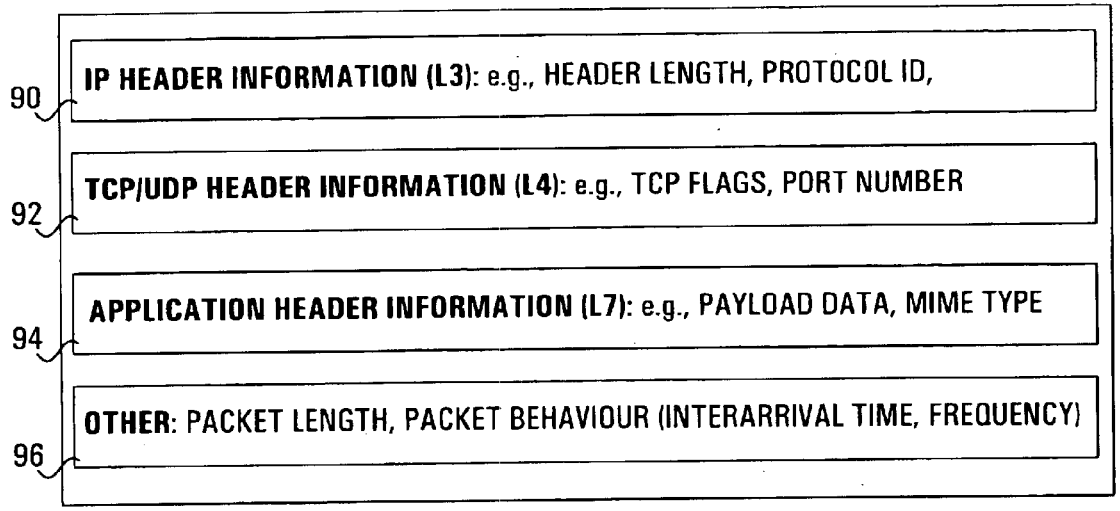
FIG. 6 is a summary of the information available to methods of identifying control packets.

Identification of control packets may be performed as the first step towards separating them from other data packets and then affording preferential treatment to them. There may be other practical purposes of control packet identification. Other purposes include, but are not limited to, identifying the control packets, extracting information from them and use them for resource reservation such as for a protocol such as RSVP (Resource Reservation Protocol). Because each packet needs to be inspected to see whether it is a control packet, it is important that the algorithm performing this task be efficient and accurate. There are various methods of identifying a control packet in an IP flow using different packet information. FIG. 6 shows the various sources of information available for control packet identification. This includes IP header information 90, TCP/UDP header information 92, application header information 94, and other information 96. Examining each piece of information will consume a certain amount of computing power and cause additional delays to packets.

Any suitable method for distinguishing between control packets and data packets may be used. For example, methods for identifying control packets include examining TCP flags and pattern matching the payload data, which need to extract information from L3/L4/L7 headers and payload respectively. However, when data packets are encrypted or compressed, depending on the particular method used, most information may become unavailable. Even if the information can be reconstructed, the processing delay caused by this will add additional difficulty for most methods of identifying control packets.

Another embodiment of the invention provides a method of identifying control packets of an IP flow with high efficiency and good accuracy using techniques based on packet length and will now be described with reference to FIGS. 7 and 8. This allows these packets to be separated from application layer (L7) data packets for example such that they can be afforded the above-described preferential treatment in delay and transmission error rate.

Through the Applicant's analysis of the traffic streams of various IP applications, it has been found that a technique based on the size of a packet is a very effective means of correctly subclassifying a control packet. In addition, packet size may be obtained very easily through examining the payload size of the L2 frame without resorting to extracting it from the L3/L4/L7 payload. In general, short packets constitute most of the control packets in today's L4/L7 protocols. An algorithm designed on the basis of this concept effectively solves the control packet identification problem.

Figure 7:
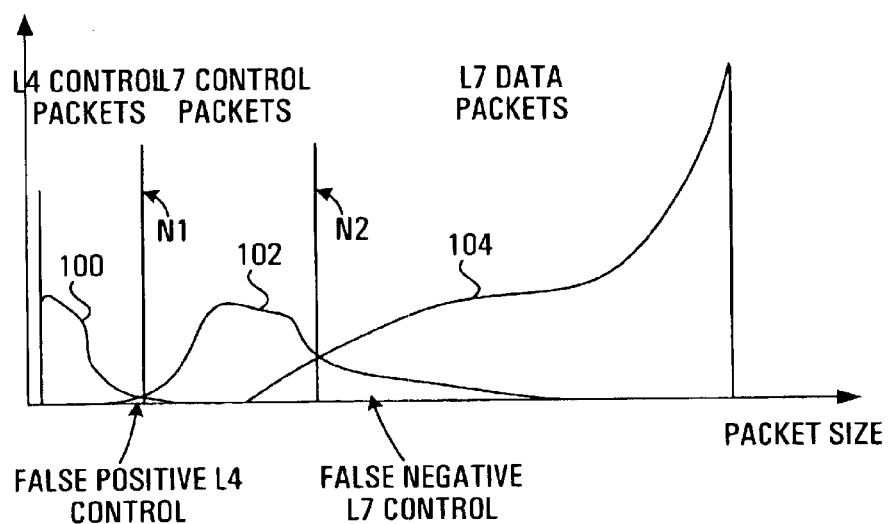
FIG. 7 is a plot of packet size distribution for L4 control packets, L7 control packets, and L7 data packets.

FIG. 7 shows an example distribution of L4 control packets (curve 100), L7 control packets (curve 102), and payload data packets (curve 104) in a typical IP application protocol determined on the basis of a simulation by the Applicant. The x-axis of the figure depicts the increasing packet size and the y-axis depicts the packet density of a particular size. The sizes of L7 control packets are typically larger than L4 control packets, and the sizes of L7 payload data are typically larger than L7 control packets.

The specific concept of the packet identification method is that by examining the length of each packet in an IP packet flow, each packet can be classified as a L4 control packet, a L7 control packet, or a L7 payload data packet.

Figure 8:
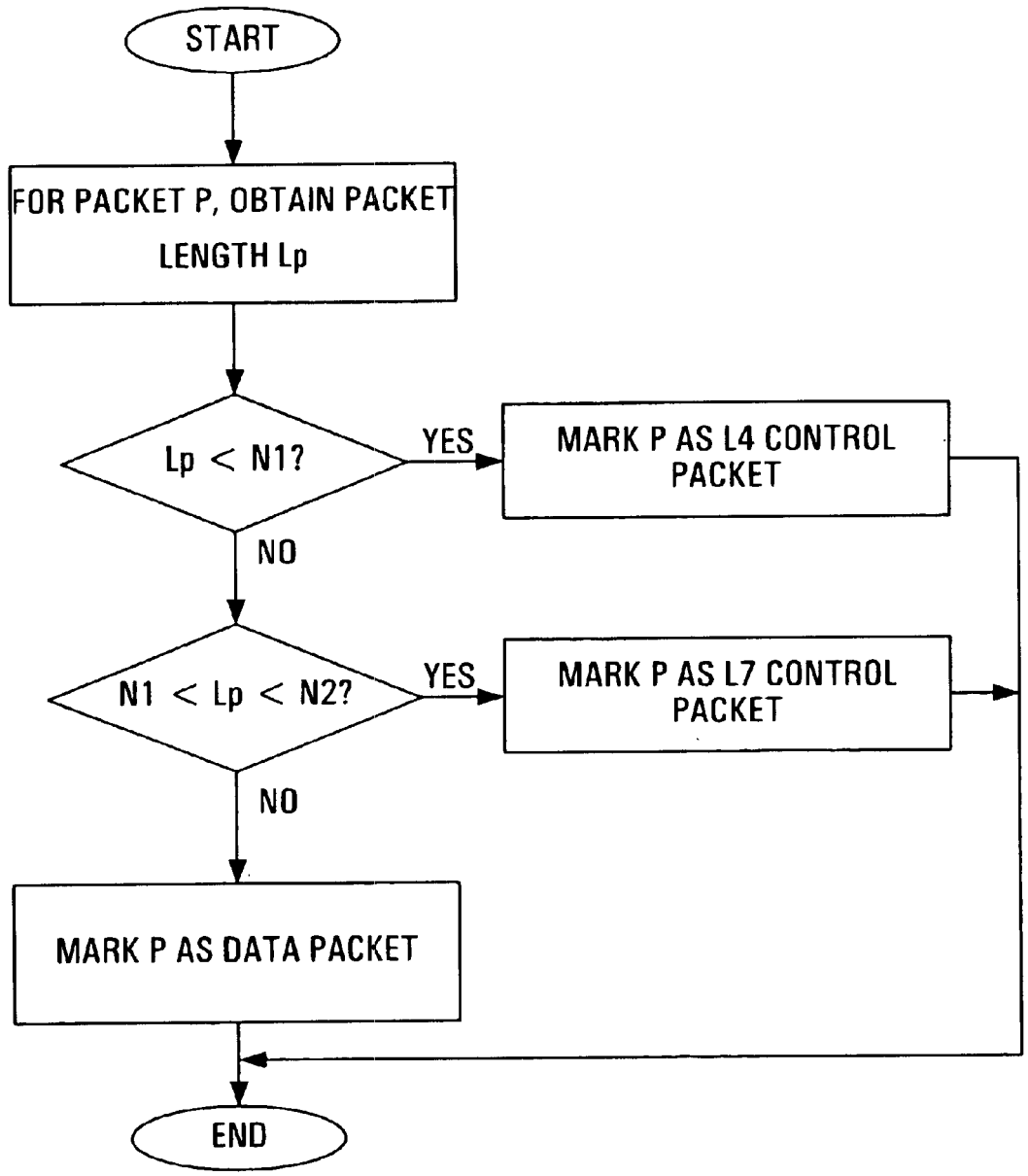
FIG. 8 is a flowchart for a method of identifying control packets according to another embodiment of the invention.

FIG. 8 is a flowchart of the algorithm for identifying L4/L7 control packets using techniques based on IP packet size. It is based on three steps, each of which progressively refines the control packets that are accurately separated from data packets. First, a packet of a particular flow is received. Its size $L_p$ is obtained by examining its L2 encapsulation frame (or the header of the IP packet itself). If the length of the packet is smaller than a first threshold N1, then it is classified as a L4 control packet (e.g., TCP control packet). This may be aided by other information such as L4 header flags or header length, but it does not depend on it. If its length is smaller than a second threshold N2 but larger than N1 (N1≦N2), then it is marked as a L7 control packet. All other packets are marked as L7 data packet.

There is an inaccuracy in the classification of packets in a flow which is characterized by the intersections between the different subclasses. The area under curve 100 to the right of N1 represents L4 control packets misclassified as L7 control packets. The area under curve 102 to the left of N1 represents L7 control packets misclassified as L4 control packets. The area under curve 102 to the right of N2 represents L7 control packets misclassified as L7 data packets. Finally, the area under curve 104 to the left of N2 represents data packets misclassified as L7 control packets. The values N1 and N2 divide the different subclasses of packets within a flow. N1 and/or N2 can be adjusted to change the bias for or against false positives or false negatives.

When there is overlapping between any of the two classes, the packet length based technique can be refined by utilizing other packet information. When encryption or compression is employed, the packet size based method only needs to adjust the packet size criteria in relation to the particular encryption or compression method used. As long as encryption and compression do not cause the packet size characteristics to change dynamically, the resulting algorithm will still be effective while maintaining the simplicity and efficiency of the algorithm.

In another embodiment, L4 protocol flags are used in combination with packet size information. It is found that there is a large overlap between L4 and L7 control packets for SMTP and POP3 applications. For these two protocols, the packet size criterion may be combined with TCP flags. TCP flags are bit map indicators carried in the TCP header to notify whether the particular TCP packet is a TCP control packet or not. For example, if the SYN bit in the TCP header is set to nonzero, it will indicate that the packet is a SYN packet used at the beginning of a TCP session to set up the TCP connection. To identify a TCP control packet by the TCP flags, one needs to examine whether TCP SYN, TCP ACK, or TCP FIN bits are set. If any of them is set, it is a control packet. However, if a TCP packet is encrypted, such bits will not be available. This results in the exact separation of L4 control packets from L7 control packets.

In another embodiment, the total packet length information is used in conjunction with L4 (e.g., TCP) and L3 (e.g., IP) header length fields to calculate whether the packet contains any L4 payload. The L4 payload is the total packet length minus the header length field. If this is zero, the packet is a L4 control packet. This also results in the exact separation of L4 control packets from L7 control packets.

The overlap between L4 and L7 control packets is not a real issue as in most situations as these two classes can be combined into a single subclass. There is no need to separate the L4 and L7 control packet subclasses. The result is a simple purely length-based algorithm for classifying the combined L4/L7 control packets. In this case there is no need for the N1 parameter.

Table 1 below provides example results of the control packet identification method using the packet size criteria. For SMTP, POP3, and Telnet, the length values are combined with L4 flags to achieve a better separation between L4 and L7 control packets.

TABLE 7

Example thresholds for length based control packet classification.

| IP Application Protocol | L4 Control | | L7 Control | | Data | |
|---|---|---|---|---|---|---|
| | Size | Acc | Size | Acc | Size | Acc |
| SMTP (1) | <40, 82]* | 100% | <48, 128] | 98% | <128, +> | 98% |
| POP3 (2) | <40, 82]* | 100% | <82, 232] | 98% | <232, +> | 98% |
| FTP Control (2) | <40, 82] | 100% | <82, +> | 100% | N/A | N/A |
| FTP Data (2) | <40, 82] | 100% | N/A | N/A | <82, +> | 90% |
| HTTP1.0 (1) | <40, 82] | 99% | <82, 232] | 99% | N/A | N/A |
| HTTP1.0 (2) | <40, 82] | 90% | <82, 232] | 87% | <232, +> | 85% |
| TELNET (2) | <40, 82]* | 100% | <40, 82] | 98% | <82, +] | 99% |

Where < $n_1$, $n_2$ > means $n_1$ < size < $n_2$ < $n_1$, $n_2$ > means $n_1$ < size ≦ $n_2$, and "+" means no upper limit.
* - Combined with TCP flags
+ - Maximum
N/A - Not applicable
Acc - Accuracy
(1) Client to server direction
(2) Server to client direction Numerous modifications and variations of the present invention are possible in light of the above teachings. It is therefore to be understood that within the scope of the appended claims, the invention may be practised otherwise than as specifically described herein.

We claim:

1. A method of transmitting a flow of variable length unclassified packets comprising:

associating each of a plurality of packet types of packets within the flow of unclassified packets with a respective channel, each channel having respective reliability and delay characteristics;

for each packet in the flow determining a length of the packer and classifying the packet into one of the plurality of different types on the basis of the length of the packet, and transmitting the packet on the channel associated with the type into which the packet was classified upon receipt of a first packet of said flow of variable length unclassified packets, establishing any of said channels not already in existence.

2. A method according to claim 1 wherein said types comprise control packets and data packets, and wherein if the packet is a control packet, the packet is transmitted on a first channel, and if the packet is a data packet the packet is transmitted on a second channel which is relatively unreliable and which has relatively high delay compared with the first channel.

3. A method according to claim 2 wherein the packet flow is an IP packet flow.

4. A method according to claim 3 wherein the data packets are L7 data packets, and the control packets are L4–L7 control packets.

5. A method according to claim 3 further comprising determining the packet length by determining an L2 payload size of the packet and examining TCP flags.

6. A mobile terminal adapted to implement the method of claim 1.

7. A wireless access node adapted to implement the method of claim 1.

8. A wireless access node for providing service to a mobile terminal, the wireless access node comprising:

an input channel adapted to receive a flow of IP variable length unclassified packets destined to the mobile terminal;

a first channel and a second channel between the wireless access node and the mobile terminal with the first channel being relatively reliable and having relatively low delay compared with the second channel;

an IP control packet classifier which processes each packet in the IP variable length unclassified packet flow and decides whether the packet is a control packet or not on the basis of packet length;

a packet transmitter adapted to transmit control packets on the first channel and data packets on the second channel wherein any of the first channel or the second channel not already in existence is established upon receipt of a first packet of said flow of IP variable length unclassified packets.

9. A wireless access node according to claim 8 wherein the data packets are L7 data packets, and the control packets are L4–L7 control packets.

* * * * *

UNITED STATES PATENT AND TRADEMARK OFFICE
CERTIFICATE OF CORRECTION

PATENT NO. : 6,757,738 B1
DATED : June 29, 2004
INVENTOR(S) : Carl F. Cao et al.

It is certified that error appears in the above-identified patent and that said Letters Patent is hereby corrected as shown below:

<u>Column 8,</u>
Line 64, "...packer..." should be -- ...packet... --.

Signed and Sealed this

Sixth Day of September, 2005

JON W. DUDAS
*Director of the United States Patent and Trademark Office*